Figure 10:
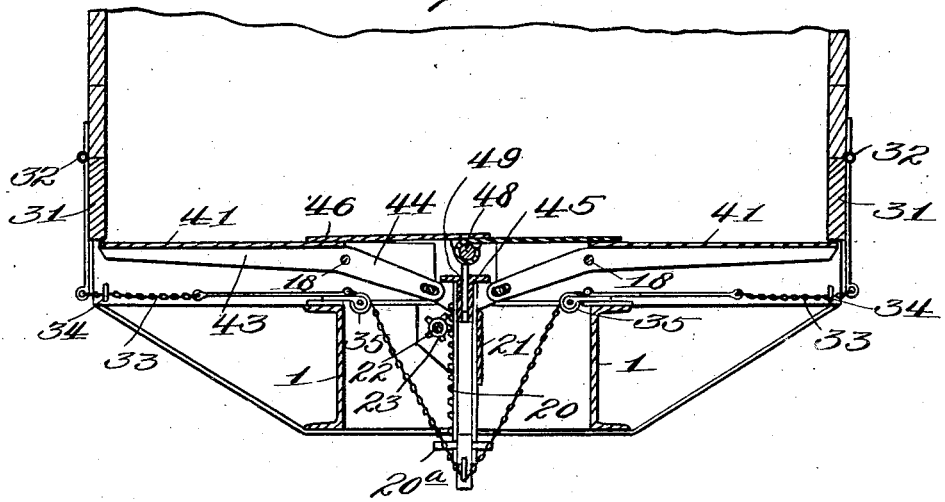

H. C. BRUNKER.
DROP BOTTOM DUMP CAR.
APPLICATION FILED APR. 17, 1909.
934,279.
Patented Sept. 14, 1909.
4 SHEETS—SHEET 1.
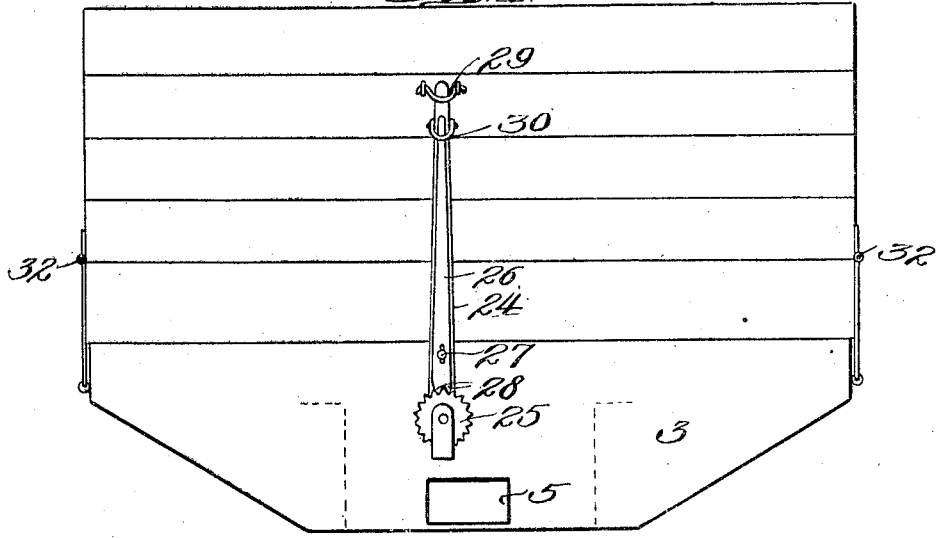
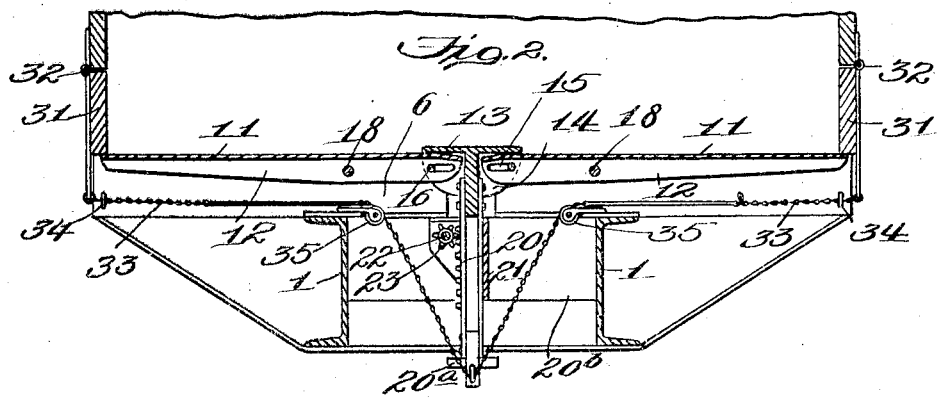
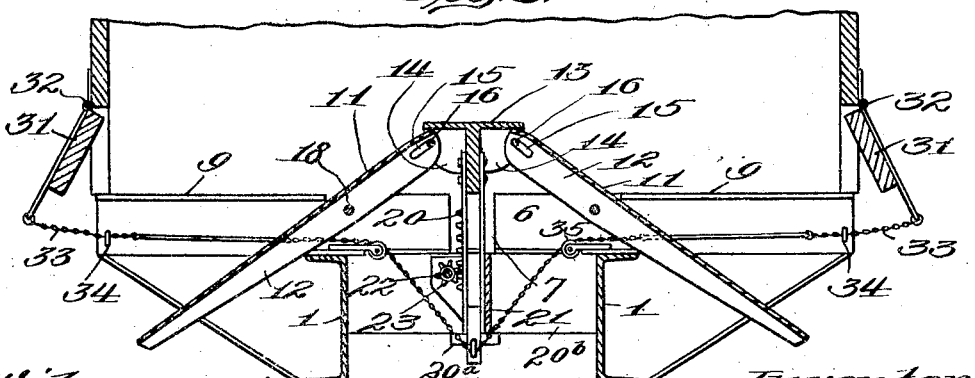
Witnesses:
Inventor
Harry C. Brunker
by James L. Norris
Atty.

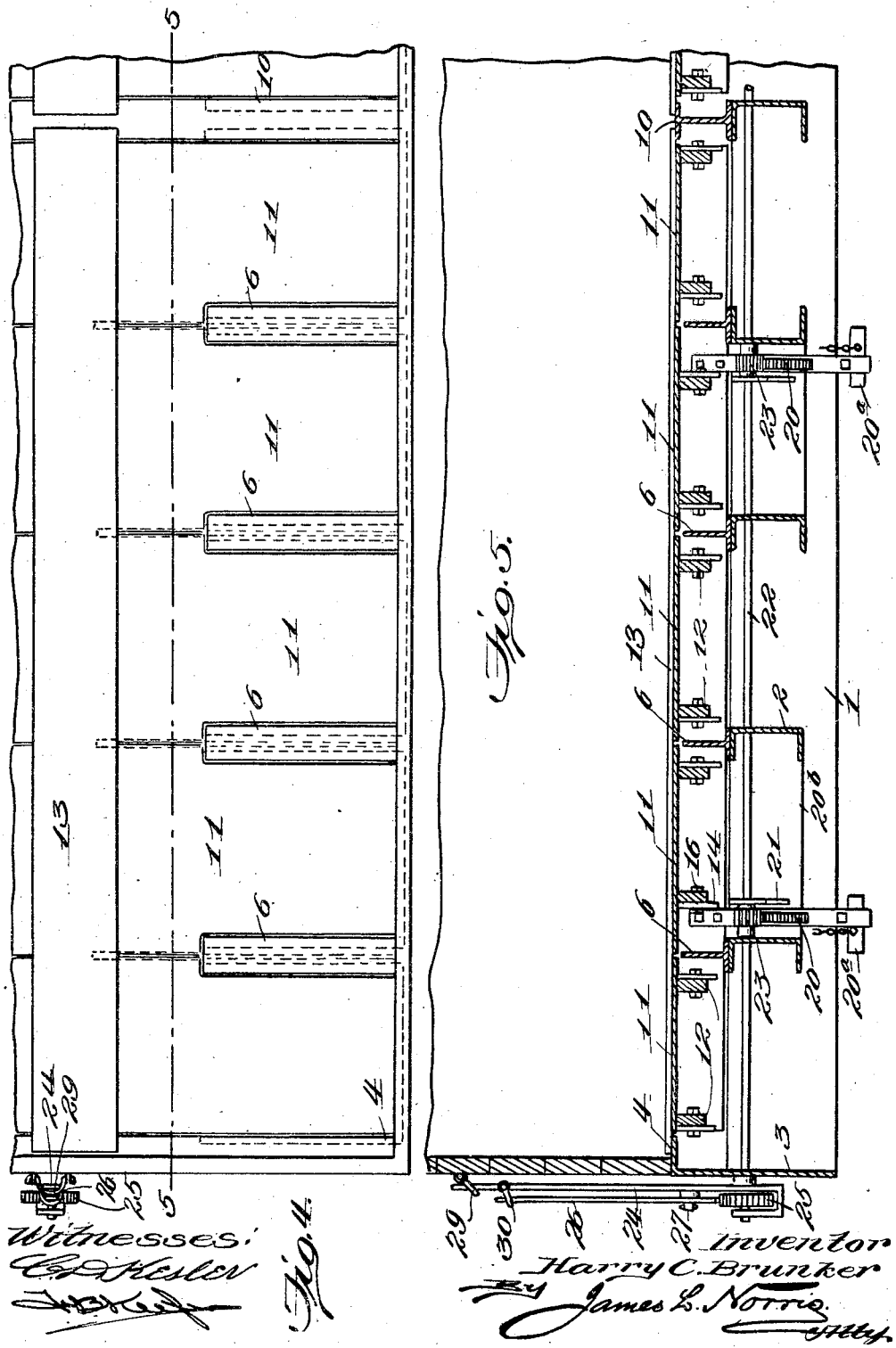

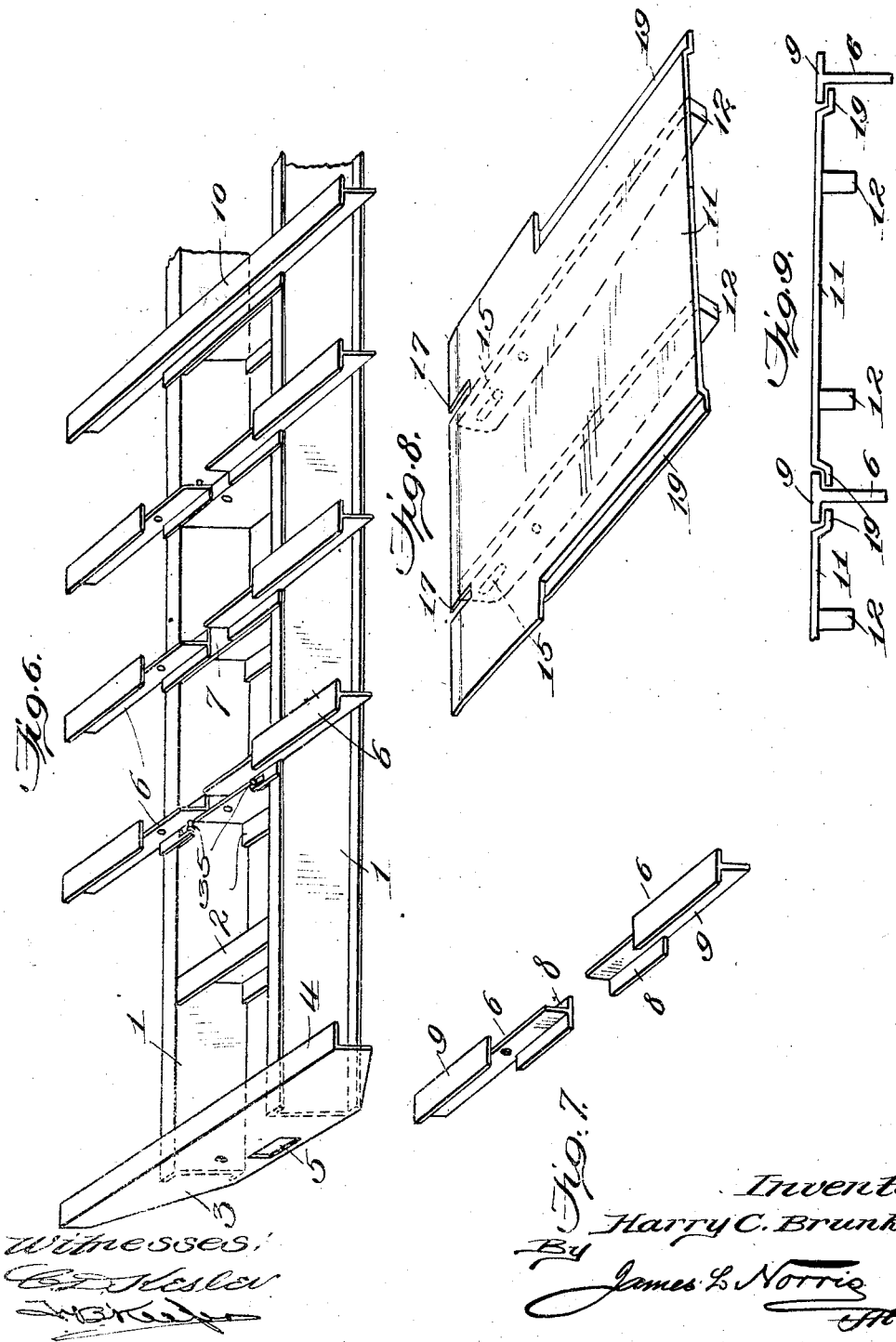

H. C. BRUNKER.
DROP BOTTOM DUMP CAR.
APPLICATION FILED APR. 17, 1909.

934,279.

Patented Sept. 14, 1909.
4 SHEETS—SHEET 4.

Witnesses:

Inventor
Harry C. Brunker
By James L. Norris

UNITED STATES PATENT OFFICE.

HARRY C. BRUNKER, OF MIDDLEPORT, OHIO.

DROP-BOTTOM DUMP-CAR.

934,279.

Specification of Letters Patent. Patented Sept. 14, 1909.

Application filed April 17, 1909. Serial No. 490,474.

*To all whom it may concern:*

Be it known that I, HARRY C. BRUNKER, a citizen of the United States, residing at Middleport, in the county of Meigs and State of Ohio, have invented new and useful Improvements in Drop-Bottom Dump-Cars, of which the following is a specification.

This invention relates to new and useful improvements in drop bottom dump cars and it has more particular reference to a dump car of that type in which hinged floor sections are provided which are operated to discharge the load and which are then returned to normal position.

In connection with a car structure of the above general type, the invention has as a primary object the provision of a sectional dumping floor of novel organization to serve the ultimate purpose of quickness and certainty in action. The floor structure is normally locked against "collapsing" but when it is released, the sections thereof are moved by the weight of the load to discharge the same, after which operation said sections return automatically to their normal positions.

The invention aims as a further object to provide a novel combined locking and actuating device by means of which the parts are positively locked against movement from their normal positions. The said device may also be actuated to cause a positive movement of the floor sections in either direction.

The invention aims as a further object to provide novel means for simultaneously operating the opposed floor sections and such means in accordance with its relation to the locking device may be either passive, that is, independent of the locking device and permitting of the automatic operation of the floor sections, or active, that is operatively depending on the locking device and not permitting but rather causing the operation of the floor sections.

The invention aims as a further object to provide such an organization of elements that the car may have in effect two floors, one at each end thereof, in order that one floor may be discharging while the other is receiving a load or in order that loads of different materials may be carried separately in the same car and separately discharged by the automatic mechanisms.

The invention aims as a further object to provide a car having means controlled by the floor sections for causing an opening movement of hinged side wall panels in order that the size of the discharge opening may be increased.

Figure 11:
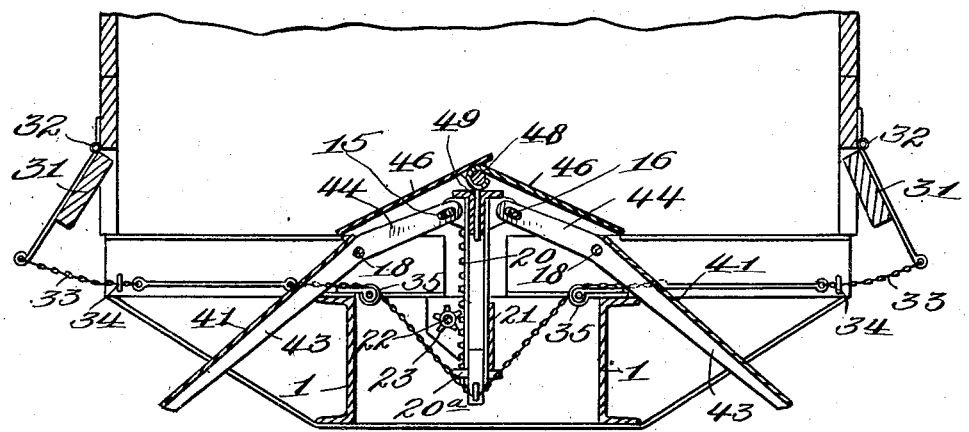
Figure 12:
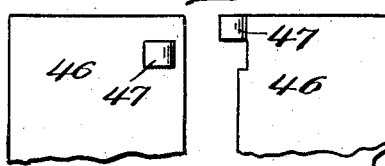

I have illustrated preferred and advantageous embodiments of the invention in the accompanying drawings wherein:

Figure 1 is an end elevation of a car showing in detail the combined locking and actuating device to which reference has been made. Fig. 2 is a transverse sectional view showing the floor sections in their normal position. Fig. 3 is a similar view showing the floor sections in their discharging position. Fig. 4 is a plan view showing a series of sections at one side of the floor. Fig. 5 is a longitudinal sectional view on the line 5—5 of Fig. 4. Fig. 6 is a detail perspective view of the skeleton floor frame with relation to which the sections forming the floor proper are assembled. Fig. 7 is a detail perspective view showing the beams to which the floor sections are pivoted. Fig. 8 is a detail perspective view of one of the floor sections, the others being similar in construction. Fig. 9 is an edge elevation showing the relation of a pair of adjacent floor sections and the intermediate beams. Fig. 10 is a transverse sectional view illustrating a modified or alternative arrangement which, however, embodies the basic principles of construction and operation of the arrangement shown in Fig. 2. The floor sections are shown in their normal positions in this figure. Fig. 11 is a similar view, showing the floor sections in their discharging positions, and Fig. 12 is a fragmentary bottom plan view of supplementary floor sections embodied in the modified arrangement.

Similar characters of reference refer to corresponding parts throughout the several views.

In Fig. 6 the frame of the car is illustrated in detail as comprising longitudinal center sills 1, which are preferably of channel bar shape and which are connected by transverse brace bars, as 2, of any suitable cross sectional shape. The sills 1 may be also reinforced by diagonal brace bars but, inasmuch as this reinforcement is well known in the art of gondola cars and its illustration would detract from the clearness of the several figures, I have not shown the same. At the ends of the sills 1 transverse end plates, as 3, are provided which project at each side of the sills and above the same and terminate at their upper edges in inwardly extending flanges, as 4. The plates 3 are provided with central openings, as 5, through which the coupling bar of the draft rigging projects. The coupling bar and the other parts of the draft rigging are assembled between the sills 1 but inasmuch as this mechanism is not relevant to the present invention, illustration thereof has not been deemed necessary. Each sill 1 supports a series of parallel cross beams, as 6, which are shown in detail in Figs. 6 and 7. Each pair of opposed beams 6 are in alinement but are spaced from one another, affording a clearance 7. The beams 6 are of peculiar construction, the portions thereof on the inner sides of the sills 1 being of inverted T shape and the portions thereof on the outer sides of said sills being of normal T shape. The said inner portions are constructed with lower flanges, as 8, for attachment to the sills 1 and bars 2 and the outer portions are constructed with upper flanges, as 9, at each side thereof, for a purpose to be described. For the sake of clearness of illustration, the beams 6 directly adjacent the plate 3, have not been shown in Fig. 6.

It has been stated that the car may have in effect two floor structures, one at each end thereof, and with this statement in mind it will be understood that Figs. 4, 5 and 6 show the structural elements which are at one end of the car and that a similar scheme of organization is carried out at the other end of the car. Between each pair of corresponding series of beams 6, a continuous transverse beam, as 10, is interposed, having end portions of normal T shape in cross section and having an intermediate portion between the sills 1, of I shape in cross section. The upper faces of the beams 6 and 10 and the flange 4 are in the same plane and these several elements have the same function.

The floor sections are designated by the numeral 11. Each section 11 comprises a flat metallic plate to the under face of which a pair of parallel transverse supporting arms, as 12, are secured. The clearances 7 provide for the assemblage of a vertically movable longitudinal operating bar, as 13, which is of normal T shape in cross section and is provided at suitable intervals with webs 14, at each side thereof. The arms 12 are formed at their inner ends with slots 15 and are pivotally connected to the several webs 14 by pins, as 16, which project through the slots 15. The inner end portions of the plates 11 project under the side flanges of the bar 13 and are provided with transverse edge slots, as 17, to accommodate the webs 14. The arms 12 are also pivoted to the vertical webs of the beams 6, as by pins 18, which are positioned near the clearance between the flanges 8 and 9 in order that the floor sections may have a material degree of pivotal movement. The flanges 9 limit the movement of the sections 11 in returning to their normal positions and fit into dished edge portions 19 which are formed at the sides of the sections 11 in the manner shown in Fig. 8. The side edges of the dished portions 19 are located slightly inwardly of the side edges of the inner portions of the plates 11, to provide clearances between the adjacent sections through which the webs of the beams 6 extend. The side edge portions of the plates 11 inwardly of the dished portions 19 extend over the upper edges of the webs of the beams 6 and are flush with the flanges 9, as shown in Figs. 4, 5 and 9.

From the foregoing description it will be understood that when parts to be later described are manipulated, the floor sections are released and, owing to the greater length of the outwardly projecting portion of each floor section, the weight of the load will cause a downward movement thereof, the inner end portions of said sections lifting the bar 13. The sections are now in position to discharge the load at each side of the car and when this has taken place, the bar 13 descends by gravity and restores the sections to their normal positions, it being understood that said bar is sufficiently heavy for this purpose.

The means for locking the floor sections normally against discharging movement is closely related to the means for positively operating the floor sections in either of their movements, and which it may be necessary to employ under certain conditions. Such operating means will now be described. The bar 13 is provided at suitable intervals with depending rack bars, as 20, which work vertically in suitable guide or channel members, as 21, which are, for convenience, shown as secured to the adjacent beams 2 but which may be disposed and suitably supported at any desired points between the beams 2. Extending longitudinally of the car frame, for any desired or necessary length and supported in the bars 2 is a shaft, as 22, which carries pinions, as 23, to engage with the rack bars 20. The shaft 22 projects at one end of the car, through the plate 3, as shown in Figs. 1 and 5. Loosely mounted upon the projecting end of the shaft 22, is a lever 24, having its lower end in the form of a yoke within which is arranged a toothed wheel 25, the latter being fast on the shaft 22. A second lever, as 26, is pivoted near its lower end, as at 27, on the lever 24, and has its lower end provided with teeth, as 28, for engagement with the wheel 25. The lever 24 is normally held against movement by a keeper, as 29, which is pivoted on the car and fits over the upper end of the lever 24, and the lever 26 is similarly held against movement with relation to the lever 24 by a keeper, as 30, which is pivoted on the latter. The lever 26 is normally retained by the keeper 30 with its teeth 28 in engagement with the wheel 25. The latter is thereby locked and it follows that the shaft 22, pinions 23, rack bars 20, bar 13 and floor sections 11 are locked. To release this train of mechanism, the keeper 30 is disengaged from the lever 26 and the latter is then moved on its pivot 27 to disengage the wheel 25. When such action happens, the operation of the parts mentioned takes place automatically, by the weight of the load in discharging and by the weight of the plates 11, in returning to normal.

In case it should be necessary to positively operate the mechanical train to cause resultant movement of the plates 11 in either direction, the lever 26 is employed as an operative connection between the lever 24 and the wheel 25, the levers 24 and 26 being locked against relative movement by the keeper 30. The lever 24, however, is manually operated in the direction desired, the keeper 29 having been disengaged therefrom. This manual operation of the lever 24 positively operates the floor sections through the medium of the train of elements described.

Each rack bar 20 is provided at its lower end with a stop disk, as 20$^a$, which engages a plate or bar 20$^b$ supported between the sills 1 and thereby serves to limit the upward movement of the bar 13 and therewith the downward movements of the sections 11.

It has been stated that the sides of the car were provided with panels which automatically opened upon the discharging movement of the floor sections. Such panels are indicated in Figs. 2 and 3 by the numeral 31 and extend longitudinally of the car, being hinged at their upper edges, as at 32. The pressure of the load causes the panels to open outwardly in order to increase the efficient size of the discharge opening occuring between the sides of the car and the tilting floor sections. The panels 31 are normally kept closed by positive means, which, when the sections 11 are operated, permits of the opening of the panels by the pressure of the load. The lower straps of the hinges 32 depend somewhat below the panels and are connected to a chain or wire, as 33, which passes through a suitable guide, as 34, on the adjacent beam, and over a roller, as 35, which is secured at the end of one of the flanges 8, the latter being cut away for some distance from the inner end of the beam 6. The inner ends of the chains or other flexible connections 33 are connected to the lower end of the bars 20 and when the latter move downwardly, the chains 33 are taken in and the panels 31 close by gravity and may not be moved from their closed positions. When the bar 20 moves upwardly the chains 33 are let out, thereby permitting the opening of the panels in the manner stated.

In Figs. 10, 11 and 12, a modified or alternative arrangement preserving the basic principles of construction and operation above outlined, has been illustrated. Under certain circumstances or conditions, it is of advantage that there be no central resistance which would retard the downward movements of the sections under the influence of the portions of the load resting thereon at the outer sides of their pivots. In this modified embodiment, means are provided whereby the weight of the load at the center of the car does not affect or minimize the weight of the loads bearing upon the outer end portions of the sections in causing an opening thereof and whereby the sections have a certain initial momentum acquiring movement prior to the raising of the central portion of the floor. By virtue of this initial movement, the central portion of the floor may be readily raised at the proper time because a great portion of the load is taken off of the said central portion at the time it is raised and also because of the momentum incident to the initial acceleration of the floor sections. Certain of the parts shown in Figs. 10 and 11 correspond exactly to certain of the parts shown in Figs. 2 and 3 and similar reference numerals are employed to designate the same. Higher reference numerals are employed to designate modified and added parts. The discharging floor sections are indicated by the numeral 41 and are each carried upon a pair of levers 43. The latter are pivoted to the beams 6 and have downwardly inclined portions 44 inwardly of their pivots. A central longitudinal operating bar, as 45, is employed. This bar is similar to the bar 13 but is of materially smaller dimensions and in normal position is received wholly in the clearances 7.

Inwardly of the sections 41, supplemental floor sections 46, forming the central portion of the floor, are arranged. The sections 46 may extend continuously the whole length of the floor and along their inner sides are formed with suitable loops, as 47, pivotally surrounding a longitudinal central rod 48. The latter has at suitable intervals, depending pins, as 49, which extend loosely through suitably formed openings in the bar 45. In the normal positions of the parts, the outer edge portions of the sections 46 rest upon the inner edge portions of the sections 41 and the inner edge portion of one section 46 overlies the inner edge portion of the other section. The floor is thus uninterrupted. The bar 45 is operated in the same manner as the bar 13. When the operating mechanism is unlocked, in the manner described, the sections 41 have an initial discharging movement which is relative to the sections 46, the latter remaining stationary. Thus, all the force of the load is spent in lowering the sections 41 and the outer portions of the load are not required to raise the central portion thereof, during such initial movement. As the downward movement of the sections 41 continues, the bar 45 ultimately engages the rod 48, raising the latter and causing the sections 46 to swing upwardly from their outer edges and to conjointly have an inverted V-shaped cross section. This movement of the sections 46 is readily accomplished with but slight expenditure of power, since the greater portion of the load has been taken therefrom during the initial movement of the sections 41 and since the latter cause the bar 45 to have a certain degree of initial accelerated momentum-acquiring movement, by reason of which the bar 45 strikes the rod 48 with a material degree of force. The pivotal movements of the sections 46 are in the direction of least resistance and this is also a material factor in contributing to the ready and easy operation of said sections. Furthermore, the central portion of the floor being of inverted V shape in discharging forms in effect an apex portion and the sections 46 are inclined continuations of the sections 41. In this manner the division and discharge of the load is quickened and rendered more complete and certain.

Having fully described my invention, I claim:

1. In a drop bottom dump car, in combination, a frame, pivoted floor sections at each side thereof, a pair of arms secured to each floor section and an operating element common to a pair of opposed sections and comprising a longitudinally extending vertically movable bar pivoted to the arms at each side thereof.

2. In a drop bottom dump car, in combination, a frame, movable floor sections at each side thereof, an operating element common to a pair of opposed sections and connected to each section of the pair, means operable to positively move the operating element and including a shaft having a toothed wheel, a pivoted lever movable independently of the shaft, a second lever pivoted on the first lever and having teeth for engagement with said wheel and a keeper to hold said levers against relative movement.

3. In a drop bottom dump car, in combination, a frame, pivoted floor sections at each side thereof, a pair of arms secured to each floor section, an operating element common to a pair of opposed sections and comprising a longitudinally extending vertically movable bar pivoted to the arms at each side thereof, and operating means for the element comprising a longitudinal shaft supported by the frame and having pinions and rack bars depending from the operating element and in mesh with the pinions.

4. In a drop bottom dump car, in combination, a frame, a plurality of transverse beams supported in series at each side of the frame, the beams of one series being spaced from the beams of the opposite series, each beam having an inner portion of inverted T shape and an outer portion of normal T shape, floor sections, means for supporting each floor section pivotally between a pair of adjacent beams, a centrally located longitudinal bar, and means pivotally connecting the bar and the floor sections on each side thereof.

5. In a drop bottom dump car, in combination, two oppositely located pivoted floor sections, an operating element centrally disposed and pivotally connected to each of the inner end portions of said sections, hinged side wall panels and chains connecting the side wall panels and the operating element.

6. In a drop bottom dump car, in combination, two longitudinally disposed series of downwardly swinging floor sections, an intermediate relatively stationary floor portion between the series and means structurally independent of the sections for raising the intermediate floor portion subsequent to the inception of the movement of the sections.

7. In a drop bottom dump car, in combination, two longitudinally disposed series of downwardly swinging floor sections, an intermediate relatively stationary floor portion between the series and comprising pivotally connected longitudinally disposed sections and means for raising the inner portions of the pivotally connected sections subsequent to the inception of the movement of the first named sections.

8. In a drop bottom dump car, in combination, two longitudinally disposed series of downwardly swinging floor sections, an operating element operatively connected to the sections, and an intermediate relatively stationary floor portion between the series which is engaged by the operating element and is raised thereby subsequent to the inception of the movement of the sections.

9. In a drop bottom dump car, in combination, two longitudinally disposed series of downwardly swinging floor sections, an operating element operatively connected to the sections, and an intermediate, relatively stationary floor portion disposed between the series and comprising two longitudinally disposed floor sections and pivotal connecting means therefor which is arranged to be engaged by the operating element and to be moved upwardly thereby subsequent to the inception of the movement of the floor sections.

10. In a drop bottom dump car, in combination, a floor comprising a downwardly swinging section, a relatively stationary floor portion at the inner side of the pivot of the section and means structurally independent of the section for raising the floor portion subsequent to the inception of the movement of the section.

11. In a drop bottom dump car, in combination, a downwardly swinging floor section, an operating element connected thereto, and an upwardly movable floor section located at the inner side of the downwardly swinging section and operated in its upward movement by the operating element.

12. In a drop bottom dump car, in combination, a frame, a plurality of transverse beams supported thereby and each having a portion of inverted T shape and a portion of normal T shape, floor sections, means for pivotally supporting the floor sections with portions thereof lying over the webs of the inverted T-shaped portions and with portions thereof lying under the flanges of the normal T-shaped portions and means for holding the floor sections normally against discharging movement.

In testimony whereof I have hereunto set my hand in presence of two subscribing witnesses.

HARRY C. BRUNKER.

Witnesses:
 WADE F. OSBORNE,
 CLARENCE J. SCHEERER.